(12) United States Patent
O'Toole et al.

(10) Patent No.: US 11,852,125 B2
(45) Date of Patent: Dec. 26, 2023

(54) GAS SEPARATED CYCLING OF SMA/NTE BUNDLES IN A FLUID ENVIRONMENT FOR POWER PRODUCTION CYCLE OR HEAT PUMP CYCLES

(71) Applicant: EXERGYN, LTD., Dublin (IE)

(72) Inventors: Kevin O'Toole, Dublin (IE); Gary O'Sullivan, Dublin (IE); Jan Pilch, Dublin (IE)

(73) Assignee: EXERGYN, LTD., Dublin (IE)

( * ) Notice: Subject to any disclaimer, the term of this patent is extended or adjusted under 35 U.S.C. 154(b) by 88 days.

(21) Appl. No.: 17/603,164

(22) PCT Filed: Apr. 14, 2020

(86) PCT No.: PCT/EP2020/060491
§ 371 (c)(1),
(2) Date: Oct. 12, 2021

(87) PCT Pub. No.: WO2020/208266
PCT Pub. Date: Oct. 15, 2020

(65) Prior Publication Data
US 2022/0195997 A1 Jun. 23, 2022

(30) Foreign Application Priority Data
Apr. 12, 2019 (GB) ..................................... 1905246

(51) Int. Cl.
*F03G 7/06* (2006.01)
(52) U.S. Cl.
CPC .................................. *F03G 7/0614* (2021.08)

(58) Field of Classification Search
USPC .................................................... 60/526–528
See application file for complete search history.

(56) References Cited

U.S. PATENT DOCUMENTS

| | | | | |
|---|---|---|---|---|
| 4,031,704 A | * | 6/1977 | Moore | F03G 7/06 60/527 |
| 6,052,992 A | * | 4/2000 | Eroshenko | F28D 20/023 60/527 |

(Continued)

FOREIGN PATENT DOCUMENTS

| | | | | |
|---|---|---|---|---|
| DE | 101017123146 B3 | * | 10/2017 | F03G 7/065 |
| DE | 102017123146 B3 | | 1/2019 | |
| WO | 2018002183 A1 | | 1/2018 | |

OTHER PUBLICATIONS

English Translation EP101017123146B3 (Year: 2017).*

*Primary Examiner* — Shafiq Mian
(74) *Attorney, Agent, or Firm* — NIXON PEABODY LLP; David F. Crosby (57) ABSTRACT

The invention provides an energy recovery system comprising a plurality of Shape-Memory Alloy (SMAs) or Negative Thermal Expansion (NTE) elements arranged to define a core and housed in an immersion chamber. A first fluid is introduced into the chamber and provides a first temperature change to activate the core from a first state to a second state and a second fluid is introduced at a second temperature to activate the core from the second state to the first state. A gas is inserted into the chamber between the first fluid and the second fluid. The advantage of the invention is that increased efficiency and power production from the SMA/NTE engine is achieved.

11 Claims, 5 Drawing Sheets

(56) References Cited

U.S. PATENT DOCUMENTS

| | | | |
|---|---|---|---|
| 6,192,683 B1* | 2/2001 | Stock .................... | F01K 27/005 |
| | | | 60/527 |
| 2011/0120118 A1 | 5/2011 | Alexander et al. | |
| 2020/0271107 A1* | 8/2020 | Patten .................... | F03G 7/065 |
| 2021/0172464 A1* | 6/2021 | Bachmaier ............. | H10N 35/00 |

* cited by examiner

Figure 1

Core fluid temperature mixing without air gap

Core fluid temperature
mixing with air gap

GAS SEPARATED CYCLING OF SMA/NTE BUNDLES IN A FLUID ENVIRONMENT FOR POWER PRODUCTION CYCLE OR HEAT PUMP CYCLES

CROSS-REFERENCE TO RELATED APPLICATIONS

This application is a 35 U.S.C. § 371 National Phase Entry Application of International Patent Application No. PCT/EP2020/060491 filed on Apr. 14, 2020, which designated the U.S., which claims benefit under 35 U.S.C. § 119(e) of GB Provisional Application No. 1905246.3 filed Apr. 12, 2019, the contents of which are incorporated herein by reference in their entireties.

FIELD

The present application relates to the field of energy recovery and in particular to the use of Shape-memory alloys (SMAs) or Negative Thermal Expansion materials (NTE) for same. This disclosure also relates to a heat pump for heating systems and/or cooling systems, such as an air conditioning system.

BACKGROUND

Low-grade heat, which is typically considered less than 100 degrees Celsius, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEGs are relatively expensive. Another largely experimental approach that has been proposed to recover such energy is the use of Shape-memory Alloys.

A Shape-memory Alloy (SMA) is an alloy that "remembers" its original, cold-forged shape which once deformed returns to its pre-deformed shape upon heating. This material is a lightweight, solid-state alternative to conventional actuators such as hydraulic, pneumatic, and motor-based systems.

The three main types of Shape-memory Alloys are the copper-zinc-aluminium-nickel, copper-aluminium-nickel, and nickel-titanium (NiTi) alloys but SMAs can also be created, for example, by alloying zinc, copper, gold and iron.

The memory of such materials has been employed or proposed since the early 1970's for use in heat recovery processes and in particular by constructing SMA engines which recover energy from heat as motion. Recent publications relating to energy recovery devices include PCT Patent Publication number WO2013/087490, assigned to the assignee of the present invention. It is desirable to translate the contraction of the SMA or NTE material into a mechanical force in an efficient manner. It is not a trivial task and generally is complicated and involves significant energy losses, as disclosed in patent publication numbers DE3014560 and US2008/034750.

Heat Pump ("HP") technologies have gained wide commercial acceptance in heating, ventilation & air conditioning ("HVAC") applications. They can offer energy savings and emissions reductions and are typically installed for heating and cooling systems in buildings or car applications etc. It has been found that a heat pump system produces a large increase in Coefficient of Performance (CoP) when using an energy recovery device of WO2013/087490. Such a heat pump system is described in unpublished PCT patent application number PCT/EP2019/062300, assigned to the assignee of the present invention.

A problem with the systems disclosed is that they do not take account of the time of reaction of each core for power production such that the cycle time between heating and cooling of cores can take a long time resulting in inefficient operation. Moreover a cycle features a hot and cold water phase that in part overlap due to the delay time in opening and closing of fluid control valves. This allows for mixing of hot or cold fluid to occur which can have detrimental effects on both the forward cycle (heat to power cycle) or reverse cycle (heat pump/refrigeration cycle). Consequently much of the energy in the working fluid is wasted between heating or cooling cycles.

Chinese patent publication number CN 206719508 U (University Northeastern) discloses a SMA actuator used to separate flows of hot and cold working fluids to avoid contamination as one stream of fluid is radioactive. The sole function of the SMA actuator is to control the circulation of fluids where the energy in the fluid is use elsewhere in the system, for example a steam turbine. This Chinese publication teaches a very different function to a system and method in an energy recovery device and/or a heat pump system.

It is therefore an object to provide an improved system and method in an energy recovery device and/or a heat pump system.

SUMMARY

According to the invention there is provided, as set out in the appended claims, an energy recovery or heat pump system comprising a plurality of Shape-Memory Alloy (SMAs) or Negative Thermal Expansion (NTE) elements arranged to define a core and housed in an immersion chamber;

a first fluid introduced into the chamber provides a first temperature change to activate the core from a first state to a second state and a second fluid is introduced at a second temperature to activate the core from the second state to the first state characterised in that a gas is introduced into the chamber between the first fluid and the second fluid such that no mixing of the first fluid and the second fluid takes place.

The advantage of the invention is that increased efficiency and power production from the SMA/NTE engine is achieved, or increased CoP within the SMA/NTE heat pump. By eliminating energy destruction via the mixing of fluids, the power production cycle can either operate faster, which means the same quantity of wire can produce more power, or a lower number of NTE strands can be used to create the same power that allow mixing to occur.

Similarly within a heat pump, the separation of fluid can be of benefit in the heating or cooling of the SMA/NTE core, and also in the separation of the fluid that is either cooled or heated by the heat pump cycle.

It will be appreciated that the invention separates the flows of hot and cold liquids or fluids using a gaseous plug to avoid mixing and to maximise energy efficiency. In the context of the present invention the SMA is the heat exchanger (not an actuator), i.e. heat is not used elsewhere in the circuit. The invention specifically relates to separate thermodynamic cycles, namely waste heat recovery and heat pump/refrigeration cycles.

In one embodiment the gas introduced is air.

In one embodiment the gas is introduced under pressure into the chamber.

In one embodiment the gas is inserted into the chamber to keep the first fluid and second fluid are separate from each other.

In one embodiment the immersion chamber comprises an inlet and an outlet.

In one embodiment the inlet is adapted to input the gas under pressure and the gas exits the outlet when the first or second fluid is removed from the chamber.

In one embodiment one or more valves are adapted to control the inlet and control at least one of the first fluid, the second fluid and the gas entering the chamber.

In one embodiment one or more valves adapted to control the outlet and control at least one of the first fluid, the second fluid and the gas exiting the chamber.

In one embodiment the plurality of Shape-Memory Alloy (SMAs) or Negative Thermal Expansion (NTE) elements are arranged as a bundle of wires positioned substantially parallel with each other to define the core.

In one embodiment the plurality of Shape-Memory Alloy (SMAs) or Negative Thermal Expansion (NTE) elements are arranged as a plurality of SMA plates positioned or stacked on top of each other to define the core.

In another embodiment there is provided a method of energy recovery comprising the steps of:
arranging a plurality of Shape-Memory Alloy (SMAs) or Negative Thermal Expansion (NTE) elements arranged define a core and housed in an immersion chamber;
introducing a first fluid into the chamber to provide a first temperature change to activate the core from a first state to a second state;
introducing a second fluid at a second temperature to activate the core from the second state to the first state; and
introducing a gas into the chamber between the first fluid and the second fluid, such that no mixing of the first fluid and the second fluid takes place.

In a further embodiment there is provided a heat pump system comprising
a plurality of Shape-Memory Alloy (SMAs) or Negative Thermal Expansion (NTE) elements arranged to define a core and housed in an immersion chamber;
a module configured to apply a tension or stress to the core and activate said core;
a first fluid introduced into the chamber provides a temperature change to change the state of the core;
a gas is introduced into the chamber between applying tension to the core and the application of the first fluid.

It will be appreciated that in addition to the gas insertion, the invention can work with a single fluid source having an arbitrary temperature. The gas source heat pump for the cold stage of the process can be done with air and the hot stage can be water supplying heat. An example of this embodiment would be one or more radiators in a hydronic heating system and method.

In one embodiment there is provided an energy recovery system or heat pump system comprising:
a plurality of Shape-Memory Alloy (SMAs) or Negative Thermal Expansion (NTE) elements arranged to define a core and housed in an immersion chamber;
a first fluid introduced into the chamber provides a first temperature change to activate the core from a first state to a second state and a second fluid is introduced at a second temperature to activate the core from the second state to the first state, wherein activation of the cores between states generates energy characterised in that:
a controlled gas is introduced into the chamber between the first fluid and the second fluid.

In another embodiment there is provided a method of energy recovery or operating a heat pump comprising the steps of:
arranging a plurality of Shape-Memory Alloy (SMAs) or Negative Thermal Expansion (NTE) elements arranged to define a core and housed in an immersion chamber;
introducing a first fluid into the chamber to provide a first temperature change to activate the core from a first state to a second state; and introducing a gas into the chamber to remove the first fluid from the chamber for a time to allow the core return from the second state to the first state; and
introducing the first fluid into the chamber to activate the core from the first state to the second state.

In a further embodiment there is provided the step of applying a stress to the core such that heat is released from the core and transferred to the first fluid when the core changes states.

In one embodiment there is provided an energy recovery system and/or method as defined in any of the appended claims 1 to 15.

In one embodiment there is provided a heat pump system and/or method as defined in any of the appended claims 1 to 15.

In one embodiment there is provided a cooling/refrigeration/air conditioning system and/or method as defined in any of the appended claims 1 to 15.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The invention relates to a heat recovery system under development which can use either Shape-Memory Alloys (SMAs) or Negative Thermal Expansion materials (NTE) to generate power from low-grade heat.

Figure 1:
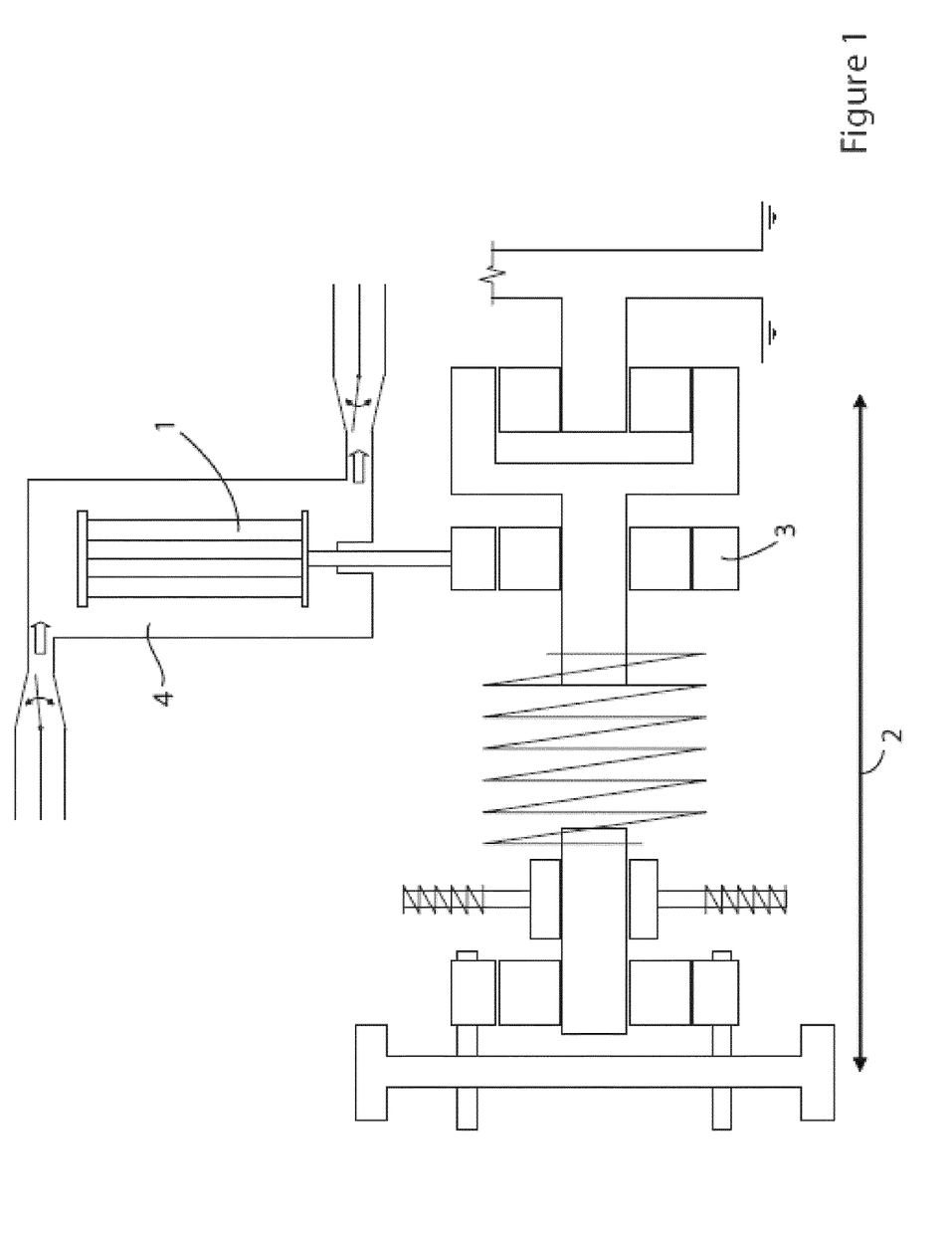
FIG. 1 illustrates a known energy recovery system.
Figure 2:
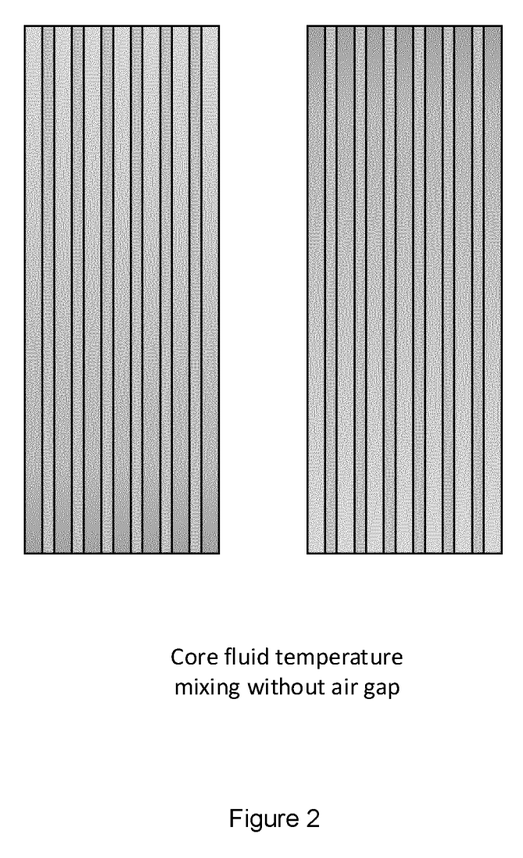
FIG. 2 illustrates a prior art mixing of two fluids of a different temperature around a core housed in a chamber.
Figure 3:
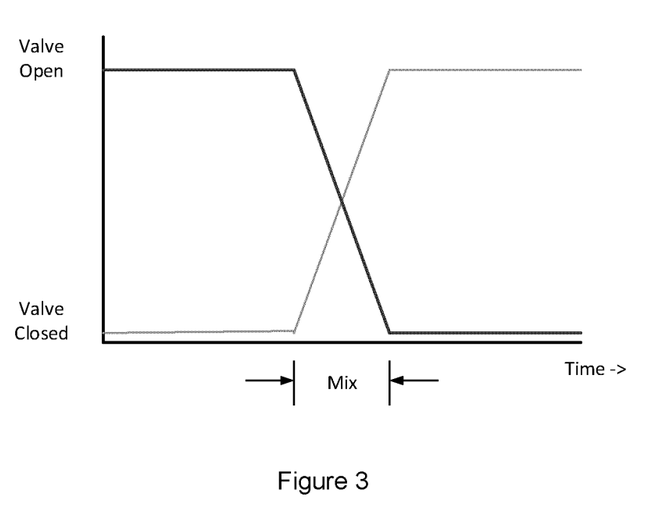
FIG. 3 illustrates a timing diagram showing the temperature gradient when a first and second fluid are introduced in the chamber.
Figure 4:
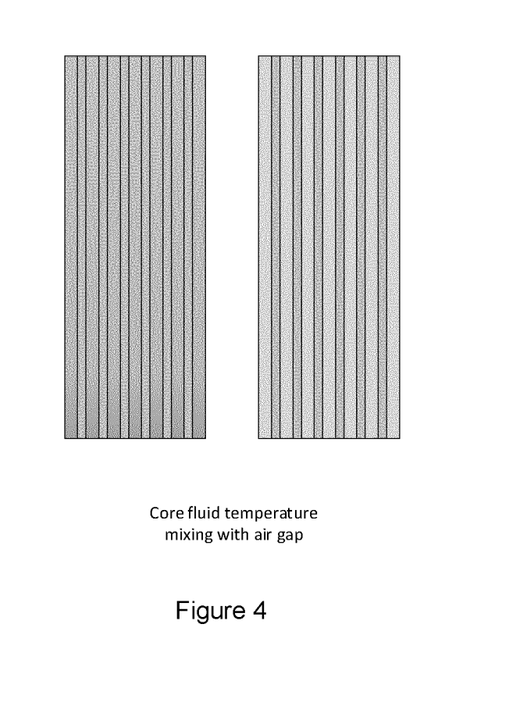
FIG. 4 illustrates mixing of two fluids of a different temperature around a core housed in a chamber according to one embodiment of the invention.
Figure 5:
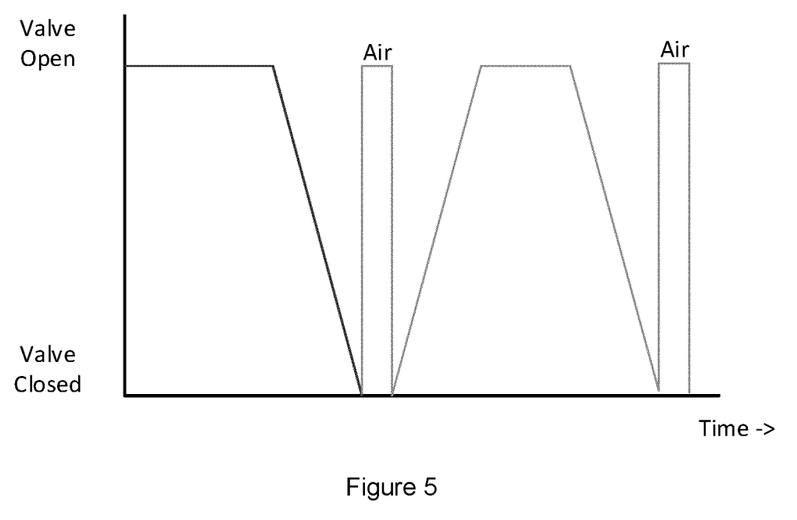
FIG. 5 illustrates a timing diagram showing the temperature gradient when a first and second fluid are introduced in the chamber showing when a gas is introduced between mixing cycles.

An exemplary known embodiment of an energy recovery device will now be described with reference to FIG. 1 which provides an energy recovery device employing a SMA engine indicated by reference numeral 1. The SMA engine 1 comprises an SMA actuation core. The SMA actuation core is comprised of SMA material clamped or otherwise secured at a first point which is fixed. At the opposing end, the SMA material is clamped or otherwise secured to a drive mechanism 2. Thus whilst the first point is anchored the second point is free to move albeit pulling the drive mechanism 3. An immersion chamber 4 adapted for housing the SMA core or engine and is adapted to be sequentially filled with fluid to allow heating and/or cooling of the SMA core or engine. Accordingly, as heat is applied to the SMA core it is free to contract. Suitably, the SMA core comprises a plurality of parallel wires, ribbons or sheets of SMA material. Alternatively the plurality of Shape-Memory Alloy (SMAs) or Negative Thermal Expansion (NTE) elements can be arranged as a plurality of SMA plates positioned or stacked on top of each other to define the core. It will be appreciated that in the context of the present invention the term 'wire' is used and should be given a broad interpretation to mean any suitable length of SMA or NTE material that can act as a core.

Typically, a deflection in and around 4% is common for such a core. Accordingly, when a 1 m length of SMA material is employed, one might expect a linear movement of approximately 4 cm to be available. It will be appreciated that the force that is provided depends on the mass of wire used. Such an energy recovery device is described in PCT Patent Publication number WO2013/087490, assigned to the assignee of the present invention, and is incorporated fully herein by reference.

For such an application, the contraction of such material on exposure to a heat source is captured and converted to usable mechanical work. A useful material for the working element of such an engine has been proven to be Nickel-Titanium alloy (NiTi). This alloy is a well-known Shape-Memory Alloy and has numerous uses across different industries. It will be appreciated that any suitable SMA or NTE material can be used in the context of the present invention.

Force is generated through the contraction and expansion of the alloy, presented as a plurality of wires (or bundle), within the working core, via a piston and transmission mechanism. Accordingly, depending on the requirements of a particular configuration and the mass of SMA material needed a plurality of SMA wires may be employed together, spaced substantially parallel to each other, to form a single core.

In one embodiment the core reacts when exposed to the hot and cold streams of fluid. The time of reaction is of most importance when trying to improve the efficiency of power production. When a hot and cold water phase that in part overlap due to the delay time in opening and closing fluid control valves. This allows for mixing to occur which can have detrimental effects on both the forward cycle (heat to power cycle) or reverse cycle (heat pump/refrigeration cycle).

Energy Recovery Embodiment

In operation a first fluid introduced into the chamber provides a first temperature change to activate the core from a first state to a second state and a second fluid is introduced at a second temperature to activate the core from the second state to the first state. The plurality of Shape-Memory Alloy (SMAs) or Negative Thermal Expansion (NTE) elements can be arranged as a plurality of SMA plates positioned or stacked on top of each other to define the core. Alternatively, the plurality of Shape-Memory Alloy (SMAs) or Negative Thermal Expansion (NTE) elements are arranged as a bundle of wires positioned substantially parallel with each other to define the core.

A gas is introduced, inserted or pumped into the chamber between the first fluid and the second fluid. The invention effectively utilises a pulse of a gas inserted into the chamber to separate the hot and cold fluid streams.

The gas can be inserted under pressure to 'flush out' the fluid in the chamber, which is then refilled with fluid of a different condition or temperature. The amount of gas to be inserted and the rate it is inserted can by controlled by a valve. The length of time the gas is inserted can be selected dependent on the activation times of the SMA or NTE material. The removal of mixing ensures that the heat transfer to and from the SMA or NTE material in the core of the system is maximised. This also benefits SMA/NTE heat pump cycles where the hot and cold outputs from the system are separated to ensure maximum delta T's can be achieved at system output.

The immersion chamber comprises an inlet and an outlet. The inlet is adapted to input the gas under pressure and the gas exits the outlet when the first or second fluid is removed from the chamber. One or more valves are adapted to control the inlet and control at least one of the first fluid, the second fluid and the gas entering the chamber. One or more valves are adapted to control the outlet and control at least one of the first fluid, the second fluid and the gas exiting the chamber.

The gas pulse applied through control of the valves should be sufficiently quick to help reduce the cycle time (which is also helped by the higher rate of heat transfer). In other words the rate and volume of gas that is inserted into the chamber can be controlled to ensure that there is no mixing of the first and second fluid. This leads to an increase in power production from the engine, or an increase in heating/cooling power in a heat pump, or an increase in output fluid deltaT in a heat pump. The gas can also be removed from the system via a suitably sized vent or similar.

For example, during a typical engine cycle, hot water is applied to the core for 10 seconds, diverted away from the inlet or stopped, and then followed by a 1 second gas pulse. Cold water would then be introduced into the core for 10 seconds, diverted away from the inlet or stopped, and followed by a 1 second gas pulse. Similarly for the heat pump application, a gas pulse could be applied on the outflow as a function of the temperature of the water in order to maximise flow temperature and minimise mixing.

Heat Pump Embodiment

In another embodiment a heat pump system comprising a plurality of wires or plates are positioned with respect to each other to define a core and housed in the immersion chamber. The plurality of Shape-Memory Alloy (SMAs) or Negative Thermal Expansion (NTE) elements can be arranged as a plurality of SMA plates positioned or stacked on top of each other to define the core. Example of such a heat pump is fully described in unpublished PCT patent application number PCT/EP2019/052300, assigned to Exergyn Limited, and fully incorporated herein by reference.

Figure 6:
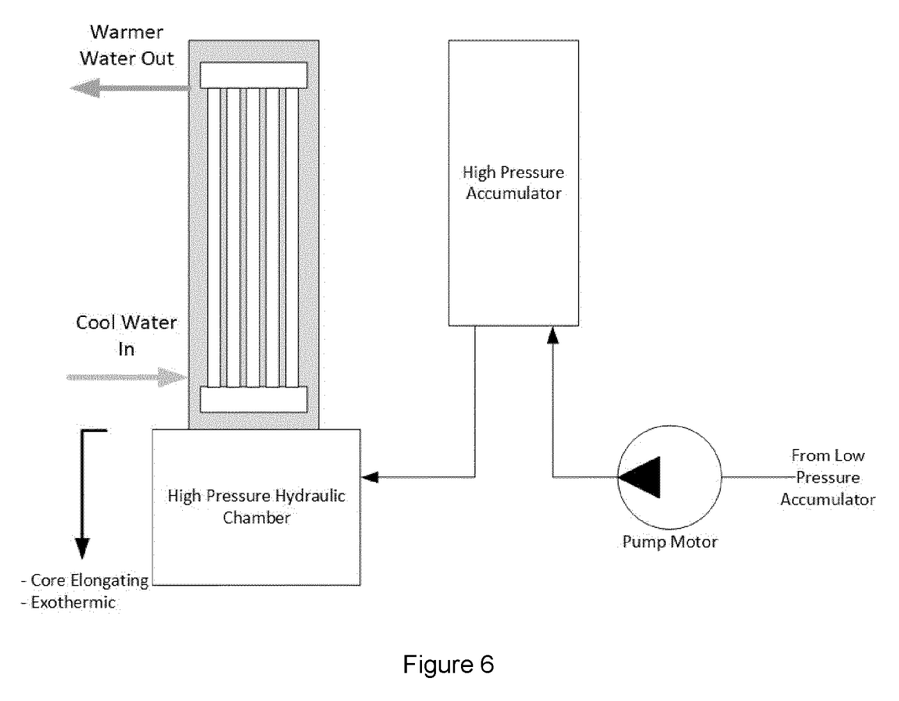
FIG. 6 illustrates a single SMA or NTE core for using in a High Pressure (HP) cycle according to one embodiment of the invention.

FIG. 6 illustrates a single SMA or NTE core for using in a High Pressure (HP) cycle according to one embodiment of the invention. FIG. 6 shows a heater pump system where cool water enters the chamber and warm water exist due to a change in state of the core. In effect the system can be used as an effective heat pump using a single core only.

Figure 7:
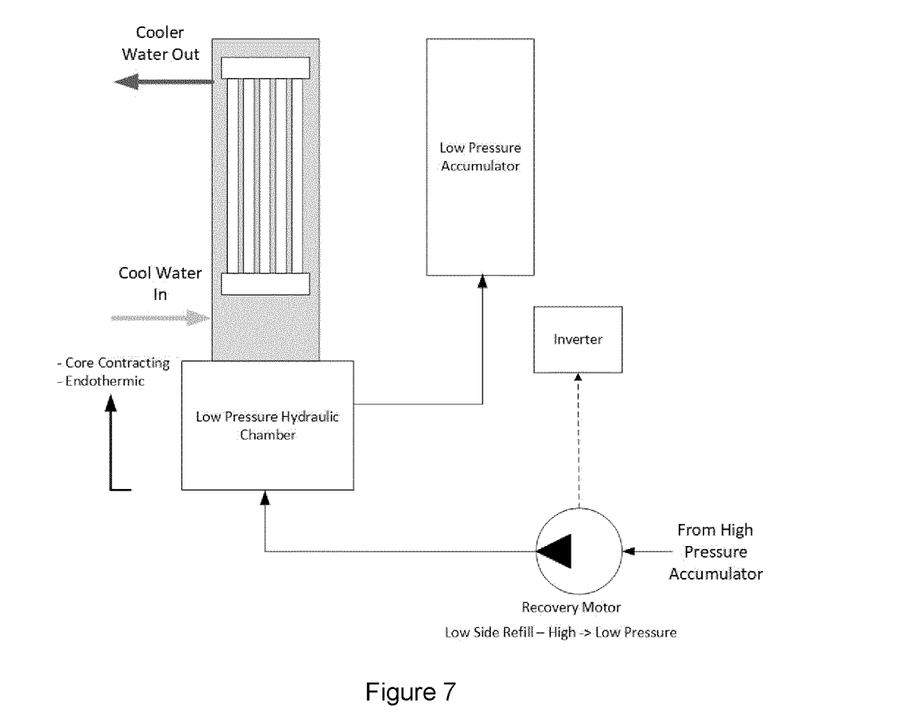
FIG. 7 illustrates a single SMA or NTE core for using in a Low Pressure (LP) cycle according to one embodiment of the invention.

FIG. 7 illustrates a single SMA or NTE core for using in a Low Pressure (LP) cycle according to one embodiment of the invention. In this embodiment FIG. 7 shows a cooling system and works in reverse to FIG. 6. Low-pressure in a hydraulic chamber is transferred to the SMA or NTE core in a core chamber in order to allow a cycle for the core to absorb heat. It will be appreciated that the invention can be applied to refrigeration systems where the system can operate in reverse and the outlet is adapted to output the second fluid at a lower temperature than the input temperature. The embodiments of FIGS. 6 and 7 can be combined to provide a single system.

A module, for example a hydraulic system, is configured to apply a stress to the core and either compress, torsion or tension the core. The amount of applied stress and time can be varied by the module. As the material transits from the austenite to martensite state an exothermic reaction takes place and heat is released from the core. A first fluid is introduced into the chamber such that the heat released is transferred into the fluid to heat the fluid. The heated fluid can then be streamed off and used as appropriate.

In reverse the gas pulse is applied to remove the first fluid from the chamber. The module can release the stress on the core such that an endothermic reaction occurs and the core absorbs heat from a second fluid applied after the gas pulse as the material returns to austenite.

The second fluid is cooled as heat is transferred from the second fluid to the core. The cooled fluid can then be streamed off separately and used as appropriate, for example as a refrigerant or in an air conditioning system. It will be appreciated that with respect to the embodiments of FIGS. 6 and 7 a single fluid can be cycled with the gas pulse delivered for a sufficient time or duration to allow the core to change state. The same fluid or fluid from the same source as the first fluid can be introduced in the chamber to start the cycle again.

Figure 8:
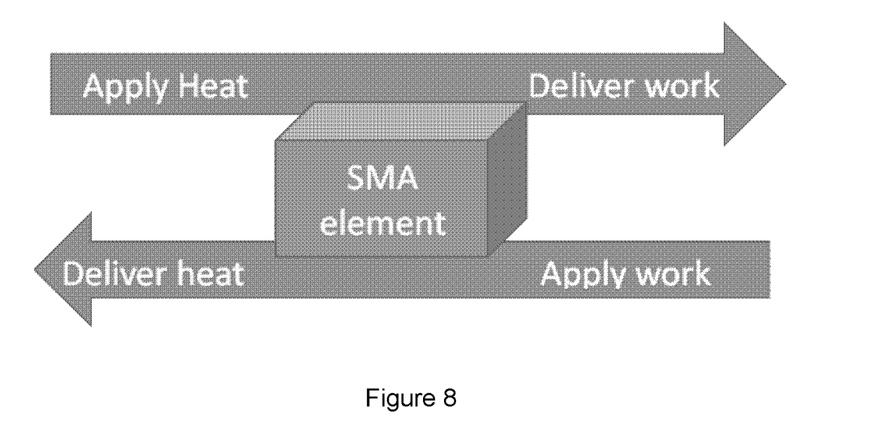
FIG. 8 illustrates how the invention can both work as an engine for energy recovery and as a heat pump.

With reference to FIG. 8 it will be appreciated that the invention can be applied to a single component in two cycles where one cycle is the reverse of the other. The SMA element can be the same design in both cases. In both cases there is a hot stage and a cold stage, mixing between the fluids in each stage is eliminated to enhance energy efficiency. The SMA can be in different structures and operated in different modes, for example wire bundles in tension or plate stacks in compression as described above. In other words the current SMA element described can be used in both engine and heat pump.

Engine cycle—The SMA element has heat applied to cause deformation (linear motion) which can be used to generate electricity.

Heat pump cycle—Deformation of the SMA element deliver thermal output (heating or cooling).

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An energy recovery system comprising:
   a plurality of Shape-Memory Alloy (SMAs) or Negative Thermal Expansion (NTE) elements arranged to define a core and housed in an immersion chamber comprising an inlet and an outlet;
   a first fluid introduced into the chamber provides a first temperature change to activate the core from a first state to a second state and a second fluid is introduced at a second temperature to activate the core from the second state to the first state characterised in that:
   a controlled gas is introduced into the chamber between the first fluid and the second fluid, such that no mixing of the first fluid and the second fluid takes place.

2. The system as claimed in claim 1 wherein the controlled gas introduced is air.

3. The system as claimed in claim 1 wherein the gas is introduced under pressure into the chamber.

4. The system as claimed in claim 1 wherein the gas is inserted into the chamber at a rate to keep the first fluid and second fluid separate from each other.

5. The system as claimed in claim 1 wherein the inlet is adapted to input the gas under pressure and the gas exits the outlet when the first or second fluid is removed from the chamber.

6. The system as claimed in claim 1 comprising one or more valves adapted to control the inlet and control at least one of the first fluid, the second fluid and the gas entering the chamber.

7. The system as claimed in claim 1 comprising one or more valves adapted to control the outlet and control at least one of the first fluid, the second fluid and the gas exiting the chamber.

8. The system of claim 1 wherein the system is configured to apply a stress to the core such that heat is released from the core and transferred to the first fluid when the core changes states.

9. The system of claim 1 wherein the plurality of Shape-Memory Alloy (SMAs) or Negative Thermal Expansion (NTE) elements are arranged as a bundle of wires positioned substantially parallel with each other to define the core.

10. The system of claim 1 wherein the plurality of Shape-Memory Alloy (SMAs) or Negative Thermal Expansion (NTE) elements are arranged as a plurality of SMA plates positioned or stacked on top of each other to define the core.

11. A method of energy recovery comprising the steps of:
    arranging a plurality of Shape-Memory Alloy (SMAs) or Negative Thermal Expansion (NTE) elements arranged to define a core and housed in an immersion chamber comprising an inlet and an outlet;
    introducing a first fluid into the chamber to provide a first temperature change to activate the core from a first state to a second state;
    introducing a second fluid at a second temperature to activate the core from the second state to the first state; and
    introducing a controlled gas into the chamber between the first fluid and the second fluid, such that no mixing of the first fluid and the second fluid takes place.

* * * * *